United States Patent
Zhao et al.

(10) Patent No.: US 10,983,828 B2
(45) Date of Patent: Apr. 20, 2021

(54) METHOD, APPARATUS AND COMPUTER PROGRAM PRODUCT FOR SCHEDULING DEDICATED PROCESSING RESOURCES

(71) Applicant: Dell Products L.P., Round Rock, TX (US)

(72) Inventors: Junping Zhao, Beijing (CN); Layne Lin Peng, Shanghai (CN); Zhi Ying, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 16/245,500

(22) Filed: Jan. 11, 2019

(65) Prior Publication Data
US 2019/0220311 A1  Jul. 18, 2019

(30) Foreign Application Priority Data

Jan. 18, 2018 (CN) .......................... 201810049267.8

(51) Int. Cl.
*G06F 9/46* (2006.01)
*G06F 9/48* (2006.01)
(Continued)

(52) U.S. Cl.
CPC .......... *G06F 9/4887* (2013.01); *G06F 9/5066* (2013.01); *H04L 41/00* (2013.01);
(Continued)

(58) Field of Classification Search
CPC ..... G06F 9/4887; G06F 9/5066; H04L 41/00; H04L 45/00; H04L 67/1029; H04L 67/325; H04L 67/327
See application file for complete search history.

(56) References Cited

U.S. PATENT DOCUMENTS 10,325,343 B1 *  6/2019  Zhao ................... G06F 11/3006
2006/0098668 A1 *  5/2006  Dona ...................... H04L 45/00
                                                                    370/401
(Continued)

OTHER PUBLICATIONS

Tony Paikeday, "Seven Service Providers Delivering the GPU-Accelerated Cloud—Built on NVIDIA GRID," https://blogs.nvidia.com/blog/2016/09/27/the-gpu-accelerated-cloud/, Sep. 27, 2016, 4 pages.

(Continued)

*Primary Examiner* — Diem K Cao

(74) *Attorney, Agent, or Firm* — Ryan, Mason & Lewis, LLP

(57) ABSTRACT

Embodiments of the present disclosure relate to a method, apparatus and computer program product for scheduling dedicated processing resources. The method comprises: in response to receiving a scheduling request for a plurality of dedicated processing resources, obtaining a topology of the plurality of dedicated processing resources, the topology being determined based on connection attributes related to connections among the plurality of dedicated processing resources; and determining, based on the topology, a target dedicated processing resource satisfying the scheduling request from the plurality of dedicated processing resources. In this manner, the performance and the resource utilization rate of scheduling the dedicated processing resources are improved.

20 Claims, 6 Drawing Sheets

(51) Int. Cl.
*H04L 29/08* (2006.01)
*G06F 9/50* (2006.01)
*H04L 12/24* (2006.01)
*H04L 12/701* (2013.01)

(52) U.S. Cl.
CPC .......... *H04L 45/00* (2013.01); *H04L 67/1029* (2013.01); *H04L 67/325* (2013.01); *H04L 67/327* (2013.01)

(56) References Cited

U.S. PATENT DOCUMENTS

| | | | | |
|---|---|---|---|---|
| 2010/0115511 | A1* | 5/2010 | Kang | G06F 9/44505 718/1 |
| 2013/0242804 | A1* | 9/2013 | Yabusaki | H04L 45/04 370/255 |
| 2014/0215045 | A1* | 7/2014 | Wang | H04L 67/10 709/223 |
| 2014/0297874 | A1* | 10/2014 | Matsubara | H04L 67/16 709/226 |
| 2017/0010920 | A1* | 1/2017 | Abouzour | G06F 9/4843 |

OTHER PUBLICATIONS

AWS.Amazon.Com, "Linux Accelerated Computing Instances," http://docs.aws.amazon.com/AWSEC2/latest/UserGuide/using_cluster_computing.html, 2018, 7 pages.

Tiffany Trader, "Microsoft Puts GPU Boosters on Azure Cloud," https://www.hpcwire.com/2015/09/29/microsoft-puts-gpu-boosters-on-azure-cloud/, Sep. 30, 2015, 22 pages.

D. Rossetti et al., "Recent Advances in CUDA for GPU Cluster Computing," http://mug.mvapich.cse.ohio-state.edu/static/media/mug/presentations/2016/MUG16_GPU_tutorial_V5.pdf, 2016, 142 pages.

H. Zhang et al., "Poseidon: An Efficient Communication Architecture for Distributed Deep Learning on GPU Clusters," Proceedings of the 2017 USENIX Annual Technical Conference (USENIX ATC), Jul. 12-14, 2017, pp. 181-193.

H. Cui et al., "GeePS: Scalable Deep Learning on Distributed GPUs with a GPU-Specialized Parameter Server," EuroSys, Apr. 18-21, 2016, 16 pages.

U.S. Appl. No. 15/498,055, filed in the name of Junping Zhao et al. on Apr. 26, 2017 and entitled "Intelligent Data Coordination for Accelerated Computing in Cloud Environment.".

U.S. Appl. No. 15/669,452, filed in the name of Junping Zhao et al. on Aug. 4, 2017 and entitled "Topology Aware Grouping and Provisioning of GPU Resources in GPU-as-a-Service Platform.".

U.S. Appl. No. 16/173,018, filed in the name of Junping Zhao et al. on Oct. 29, 2018 and entitled "Method, Device and Computer Program Product for Protocol Selection.".

U.S. Appl. No. 16/173,039, filed in the name of Junping Zhao et al. on Oct. 28, 2018 and entitled "Method, System and Computer Program Product.".

U.S. Appl. No. 15/496,568, filed in the name of Junping Zhao et al. on Apr. 25, 2017 and entitled for "Checkpointing for GPU-as-a-Service in Cloud Computing Environment.".

* cited by examiner

METHOD, APPARATUS AND COMPUTER PROGRAM PRODUCT FOR SCHEDULING DEDICATED PROCESSING RESOURCES

RELATED APPLICATION(S)

The present application claims priority to Chinese Patent Application No. 201810049267.8, filed Jan. 18, 2018 and entitled "Method, Apparatus and Computer Program Product for Scheduling Dedicated Processing Resources," which is incorporated by reference herein in its entirety.

FIELD

Embodiments of the present disclosure generally relate to resource scheduling, and specifically to a method, apparatus and computer program product for scheduling dedicated processing resources.

BACKGROUND

In recent years, new technologies such as high-performance calculation, machine learning, deep learning and artificial intelligence have developed rapidly. In the current data center or cloud, in addition to resources such as central processing units (CPUs) and storage apparatuses that are provided for the workloads of these new technologies, dedicated processing resources, for instance, graphic processing units (GPUs) and field programmable gate arrays (FPGAs), are also provided to meet the needs of these new technologies for dedicated processing. However, to better serve these new technologies, it is necessary to improve a technology for scheduling dedicated processing resources.

SUMMARY

Embodiments of the present disclosure provide a method, apparatus and computer program product for scheduling dedicated processing resources.

According to a first aspect of the present disclosure, there is provided a method of scheduling dedicated processing resources. The method comprises: in response to receiving a scheduling request for a plurality of dedicated processing resources, obtaining a topology of the plurality of dedicated processing resources, the topology being determined based on connection attributes related to connections among the plurality of dedicated processing resources; and determining, based on the topology, a target dedicated processing resource satisfying the scheduling request from the plurality of dedicated processing resources.

According to a second aspect of the present disclosure, there is provided an apparatus for scheduling dedicated processing resources. The apparatus comprises at least one processing unit and at least one memory. The at least one memory is coupled to the at least one processing unit and storing instructions to be executed by the at least one processing unit. The instructions, when executed by the at least one processing unit, cause the apparatus to perform acts comprising: in response to receiving a scheduling request for a plurality of dedicated processing resources, obtaining a topology of the plurality of dedicated processing resources, the topology being determined based on connection attributes related to connections among the plurality of dedicated processing resources; and determining, based on the topology, a target dedicated processing resource satisfying the scheduling request from the plurality of dedicated processing resources.

According to a third aspect of the present disclosure, there is provided a computer program product that is tangibly stored on a non-transitory computer readable medium and comprises machine-executable instructions. The machine-executable instructions, when executed, cause the machine to perform steps of the method described according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in exemplary embodiments of the present disclosure.

Throughout the drawings, the same or similar reference symbols refer to the same or similar elements.

DETAILED DESCRIPTION

Figure 1:
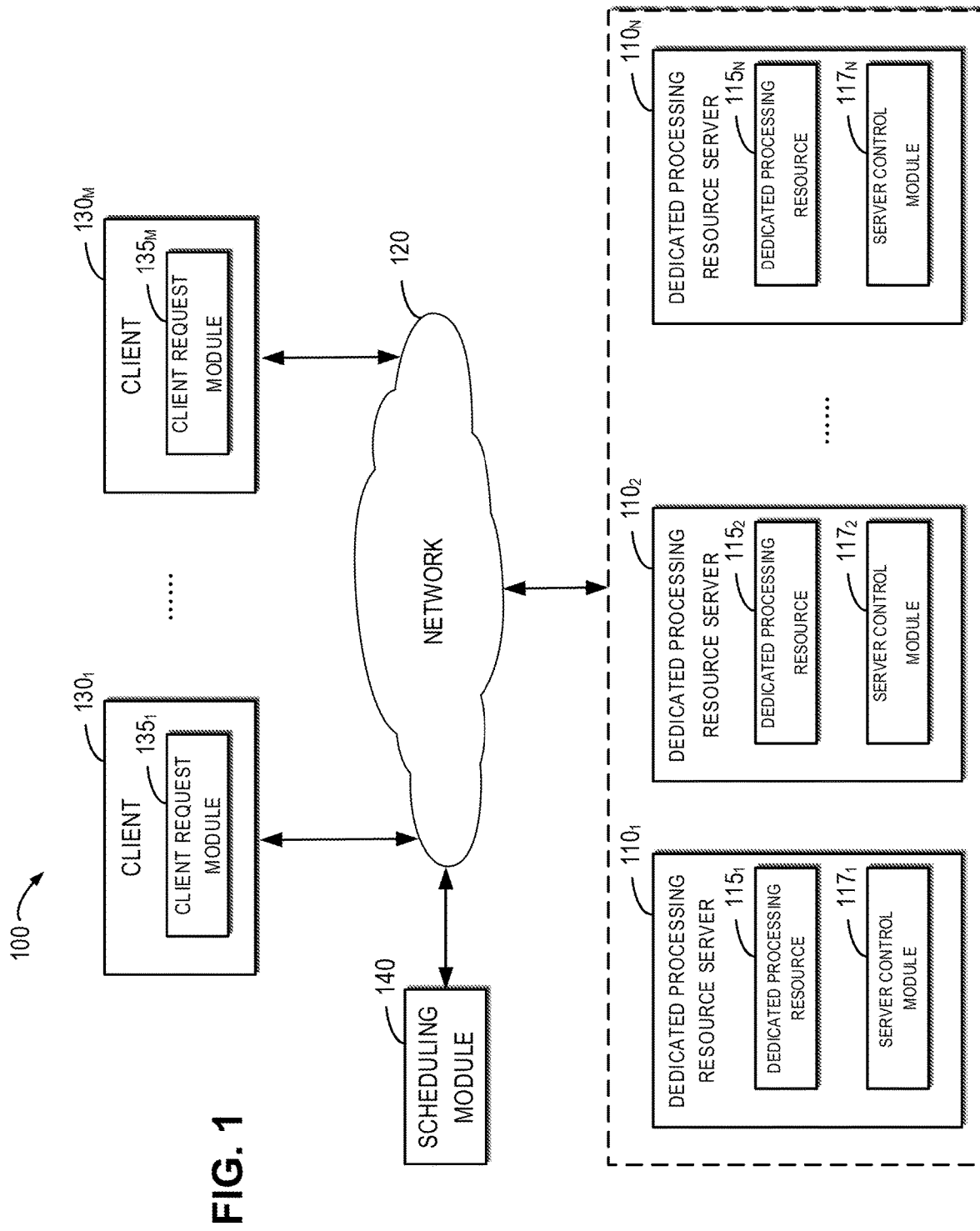
FIG. 1 illustrates a schematic diagram of a dedicated processing resource scheduling system according to an embodiment of the present disclosure.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "an example implementation" are to be read as "at least one example implementation." The term "another implementation" is to be read as "at least one other implementation." The terms "a first," "a second" and others can denote different or identical objects. The following text may also contain other explicit or implicit definitions.

Conventionally, regarding the scheduling of dedicated processing resources, no thought is given to a topology of a dedicated processing resource cluster. The topology relates to, for example, connections among dedicated processing resource servers and connections among the dedicated processing resources and relevant hardware resources in the dedicated processing resource servers. In such an arrangement, there is no method of evaluating the topology. Hence, it is impossible to use the topology of the dedicated processing resource cluster to configure and schedule the dedicated processing resources. For example, in the case that a client requests a certain amount of dedicated processing resources, it is impossible to use the topology of the dedicated processing resource cluster to configure and schedule the certain amount of dedicated processing resources in an optimized manner.

In order to at least partly solve one or more problems described above and other potential problems, exemplary embodiments of the present disclosure provide a solution of scheduling dedicated processing resources. According to the solution, the topology of the dedicated processing resource cluster is determined based on connection attributes related to the connections of dedicated processing resources in the dedicated processing resource cluster. In addition, according to the solution, in response to receiving a scheduling request for the dedicated processing resources, the topology is used to determine, from the dedicated processing resource cluster, the dedicated processing resources meeting the scheduling request. In this manner, it is possible to use the topology of the dedicated processing resource cluster to configure and schedule the dedicated processing resources in an optimized manner. Therefore, it is possible to improve the performance and resource utilization rate of a dedicated processing resource scheduling system in a smart and effective manner.

A Dedicated Processing Resource Scheduling System

FIG. 1 illustrates a schematic diagram of a dedicated processing resource scheduling system 100 according to an embodiment of the present disclosure. It should be appreciated that the dedicated processing resource scheduling system 100 as shown in FIG. 1 is only for exemplary purpose, without suggesting any limitation to the scope of the present disclosure. Embodiments of the present disclosure may be embodied in different structures.

As shown in FIG. 1, the dedicated processing resource scheduling system 100 comprises a group of dedicated processing resource servers $110_1$-$110_N$ (hereinafter collectively referred to as the dedicated processing resource server 110), wherein N is a natural number larger than 1. The dedicated processing resource servers $110_1$-$110_N$ may include dedicated processing resources $115_1$-$115_N$ (hereinafter collectively referred to as the dedicated processing resource 115), respectively. For purpose of simplification, FIG. 1 only shows that one dedicated processing resource server 110 comprises one dedicated processing resource. However, it should be appreciated that one dedicated processing resource server 110 may include a plurality of dedicated processing resources.

The dedicated processing resource servers 110 may be connected to one another via a network 120. The network 120 may be, for example but not limited to, based on a transmission control protocol (TCP), Remote Direct Memory Access (RDMA) and the like. For example, the network 120 may be 10/25/40/100 Gb RDMA over Converged Ethernet (RoCE)/iWRAP/InifiniBand (IB).

It is noted that although FIG. 1 shows separate dedicated processing resource servers $110_1$-$110_N$ and dedicated processing resources $115_1$-$115_N$ thereon, the dedicated processing resource servers $110_1$-$110_N$ and the dedicated processing resources $115_1$-$115_N$ may be regarded as pooled and virtual manageable resources (as shown in the dotted-line block in FIG. 1). In addition, the dedicated processing resource servers $110_1$-$110_N$ may have different configurations. Hence, as compared with the conventional technologies, the dedicated processing resource cluster including a plurality of dedicated processing resource servers $110_1$-$110_N$ is dynamic and shared.

In some embodiments, the dedicated processing resource servers $110_1$-$110_N$ may further include server control modules $117_1$-$117_N$ (hereinafter collectively referred to as the server control module 117), respectively. The server control module 117 may manage a request to schedule the dedicated processing resource 115 in the dedicated processing resource server 110, and obtain connection attributes and states such as the resource utilization rate of the dedicated processing resource server 110 and the dedicated processing resource 115 therein.

The dedicated processing resource scheduling system 100 further includes a group of clients $130_1$-$130_M$ (hereinafter collectively referred to as client 130), wherein M is a natural number larger than 1. In some embodiments, clients $130_1$-$130_M$ may include client request modules $135_1$-$135_M$ (hereinafter collectively referred to as the client request module 135), respectively. The client request module 135 is used to request for the dedicated processing resource 115 in the dedicated processing resource server 110 before the client 130 performs the processing in need of the dedicated processing resource.

In addition, the dedicated processing resource scheduling system 100 further includes a scheduling module 140. The scheduling module 140 may determine the topology of the dedicated processing resource cluster, and configure and schedule the dedicated processing resource based on the topology. An example operation of the scheduling module 140 is described below with reference to FIG. 2.

Figure 2:
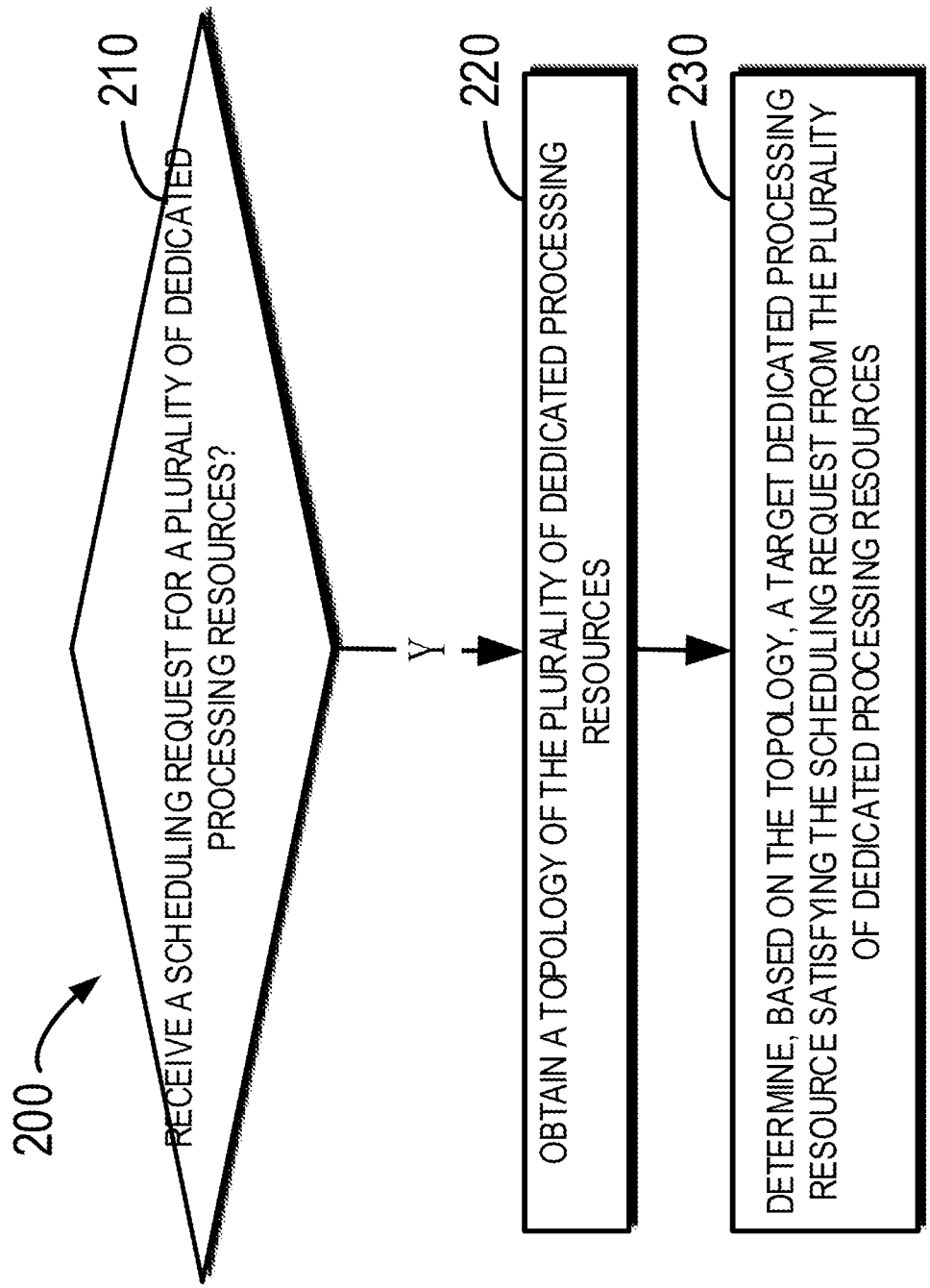
FIG. 2 illustrates a flow chart of a method of scheduling dedicated processing resources according to an embodiment of the present disclosure.

FIG. 2 illustrates a flow chart of a method 200 of scheduling dedicated processing resources according to an embodiment of the present disclosure. For example, the method 200 may be executed by the scheduling module 140 as shown in FIG. 1. It should be appreciated that the method may further include additional steps not shown and/or the shown steps may be omitted. The scope of the present disclosure is not limited in this regard.

At 210, the scheduling module 140 determines whether a request to schedule the dedicated processing resource 115 is received. At 220, the scheduling module 140, in response to having received the request to schedule the dedicated processing resource 115, obtains the topology of the dedicated processing resource cluster. For example, the scheduling module 140 may obtain the topology upon having received, via the network 120, the request sent by the client 130 to schedule the dedicated processing resource.

The topology is determined based on connection attributes related to the connections among the dedicated processing resources. In some embodiments, the topology may be determined based on the following aspects: (1) a connection attribute (hereinafter referred to as a first connection attribute) related to the connection between the dedicated processing resource servers 110 and (2) a connection attribute (hereinafter referred to as a second connection attribute) related to the connection between the dedicated processing resource 115 and a relevant hardware resource (e.g., the CPU and the network card) in a single dedicated processing resource server 110.

Optionally, in the case of enabling a direct connection of a dedicated processing resource 115 to a dedicated processing resource 115, the topology may also be determined based on the connection attribute of the direct connection. Optionally, the topology may additionally be determined based on the utilization rate (load state) of the dedicated processing resource 115. In some embodiments, these connection attributes and resource utilization rate may be obtained by the scheduling module 140 from the server control module 117.

At 230, the scheduling module 140 may, based on the topology, determine the dedicated processing resource 115 (hereinafter referred to as a target dedicated processing resource) meeting the scheduling request from the dedicated processing resource cluster. Hereinafter, a detailed example of the method 200 will be described with reference to FIG. 5.

Then, the scheduling module 140 may configure and schedule the determined target dedicated processing resource. In some embodiments, the scheduling module 140 may send a scheduling response indicative of the target dedicated processing resource to the server control module 117 in the dedicated processing resource server 110, so that the dedicated processing resource server 110 may provide the client 130 with the amount of the dedicated processing resources needed by the client. Alternatively, the scheduling module 140 may send a scheduling response indicative of the target dedicated processing resource to the client 130, so that the client 130 may request the dedicated processing resource server 110 for the target dedicated processing resource according to the scheduling response.

In this manner, the dedicated processing resource scheduling system 100 may determine a dedicated processing resource centered topology in the range of the cluster, and implement optimized dedicated processing resource scheduling based on the topology, thereby improving the performance and the resource utilization rate.

The Topology of the Dedicated Processing Resource

Hereinafter, reference will be made to FIG. 3 and FIG. 4 to describe the topology of the dedicated processing resource and the method of determining the topology according to embodiments of the present disclosure. For example, the method may be executed by the scheduling module 140 as shown in FIG. 1. It should be appreciated that the method may further include additional steps not shown and/or the shown steps may be omitted. The scope of the present disclosure is not limited in this regard.

To determine the topology of the dedicated processing resource, the scheduling module 140 may obtain at least one of the first connection attribute and the second connection attribute from the server control module 117 in the dedicated processing resource server 110. Optionally, in the case of enabling the direct connection from the dedicated processing resource 115 to the dedicated processing resource 115, the scheduling module 140 may further obtain the connection attribute of the direct connection from the server control module 117. Optionally, the scheduling module 140 may further obtain the utilization rate of the dedicated processing resource 115 from the server control module 117.

As stated above, the first connection attribute may be the connection attribute related to the connection between the dedicated processing resource servers 110. For example, the first connection attribute may indicate a delay, a bandwidth, a throughput, a transmission rate, a transmission quality and/or a network utilization rate of the connections among the plurality of dedicated processing resource servers 110. In some embodiments, the first connection attribute may further indicate the connection attribute related to the connection between the dedicated processing resource server 110 and the network device (e.g., a switchboard and a router) in the network 120.

In addition, the second connection attribute may be the connection attribute related to the connection between the dedicated processing resource 115 and a relevant hardware resource (such as a CPU and a network card) in a single dedicated processing resource server 110. For example, the second connection attribute may indicate the type of the connection between the dedicated processing resource 115 and a relevant hardware resource in a single dedicated processing resource server 110.

In some embodiments, the second connection attribute may indicate the type of the connection between the dedicated processing resource and the CPU. For example, the type of the connection may be an internal bus such as an NVLink bus, Peripheral Component Interconnect Express switch (PCIe switch), direct PCIe connect or QuickPath Interconnect (QPI). In other embodiments, the second connection attribute may indicate the type of the connection between the dedicated processing resource and the network card. For example, the type of the connection may be the PCIe switch.

In some embodiments, the server control module 117 may periodically obtain the first connection attribute and the second connection attribute, and send the obtained first connection attribute and second connection attribute to the scheduling module 140. For example, with respect to the first connection attribute, the server control module 117 may obtain the first connection attribute related to the connection between the dedicated processing resource servers 110 by periodically communicating with one another. With respect to the second connection attribute, the server control module 117 may obtain the second connection attribute in the single dedicated processing resource server 110 and related to the connection between the dedicated processing resource 115 and the relevant hardware resource periodically via a system utility program and/or a dedicated processing resource driver utility program.

Then, the scheduling module 140 may determine the topology of the dedicated processing resources based on at least one of the obtained first connection attribute and second connection attribute. Hereinafter, two examples of determining the topology is described with reference to FIG. 3 and FIG. 4.

Figure 3:
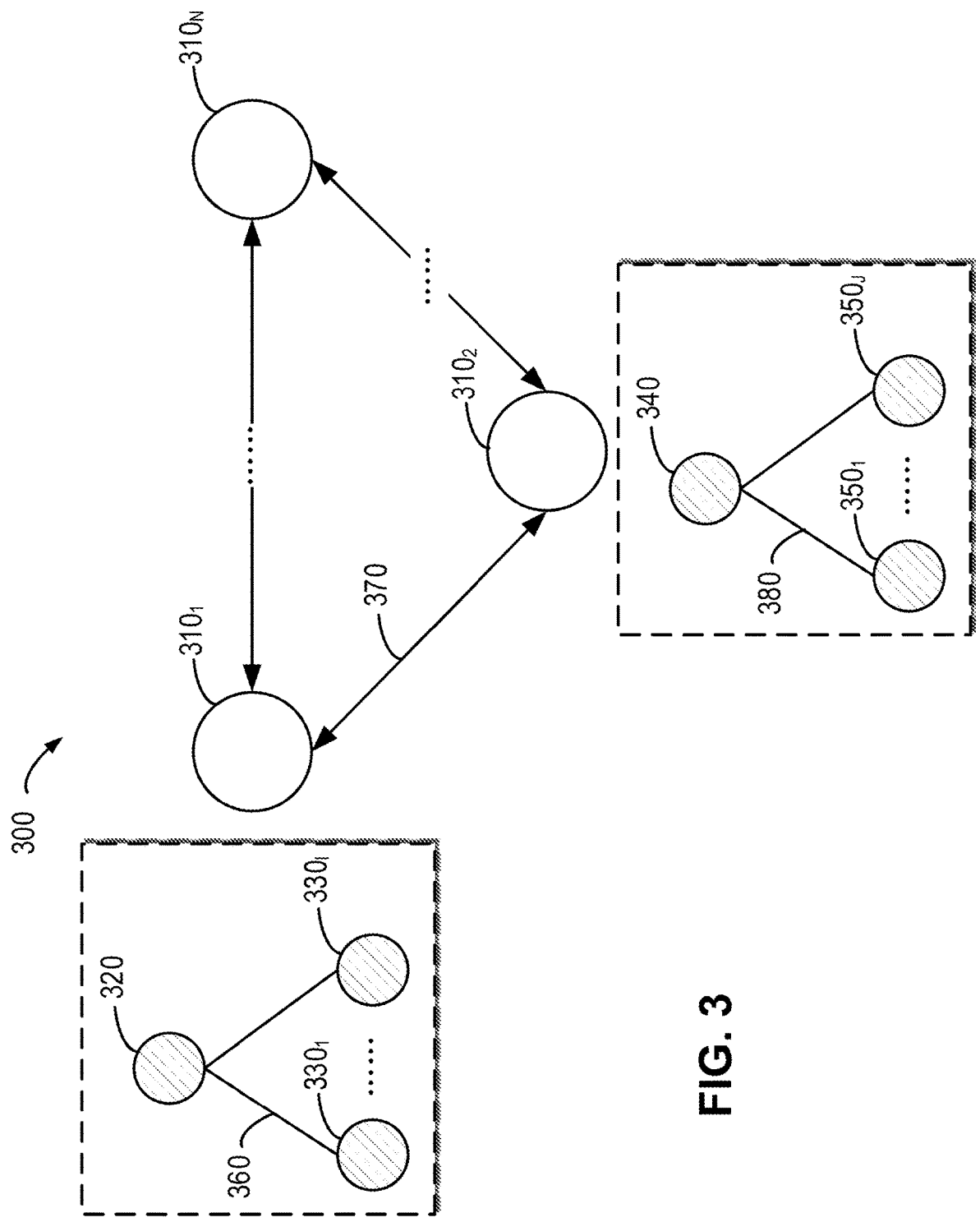
FIG. 3 illustrates a schematic diagram of an example of a topology of dedicated processing resources according to an embodiment of the present disclosure.

FIG. 3 illustrates the topology 300 determined by the scheduling module 140 based on the first connection attribute and second connection attribute. As shown in FIG. 3, in some embodiments, the scheduling module 140 may organize the topology 300 in the form of a graph. The topology 300 comprises a group of nodes $310_1$-$310_N$ (hereinafter collectively referred to as node 310). The scheduling module 140 may determine the dedicated processing resource server 110 as the node 310 of the topology 300. For example, the scheduling module 140 may determine the dedicated processing resource server $110_1$ as the node $310_1$, determine the dedicated processing resource server $110_2$ as the node $310_2$, and determine the dedicated processing resource server $110_N$ as the node $310_N$.

It may be appreciated that since the node 310 is the representation of the dedicated processing resource server 110 in the topology 300, the connection (also called an edge) between the nodes 310 may represent the connection between the dedicated processing resource servers 110.

The scheduling module 140 may, based on the first connection attribute, determine a distance (a distance of an edge) between two nodes 310 that are connected among the plurality of nodes 310. The distance may indicate the performance of the connection between the two nodes 310 that are connected. That is to say, the distance may indicate the performance of the connection between two dedicated processing resource servers 110 that are connected. In some embodiments, the distance may be represented with a numerical value, wherein a larger numerical value may indicate that the performance of the connection is worse, and a smaller numerical value may indicate that the performance of the connection is better.

In addition, since there exists the connection between the dedicated processing resource 115 and the relevant hardware resource in the dedicated processing resource server 110, the node 310 may further include sub-nodes. The scheduling module 140 may determine the dedicated processing resource 115 and the relevant hardware resource in a single dedicated processing resource server 110 as the sub-nodes.

For example, the scheduling module 140 may determine the network card in the dedicated processing resource server $110_1$ as a sub-node 320 in the node $310_1$, and determine the dedicated processing resource in the dedicated processing resource server $110_1$ as sub-nodes $330_1$-$330_I$ (hereinafter collectively referred to as sub-node 330) in the node $310_1$, wherein I is a natural number larger than 1. Similarly, the scheduling module 140 may determine the network card in the dedicated processing resource server $110_2$ as a sub-node 340 in the node $310_2$, and determine dedicated processing resource in the dedicated processing resource server $110_2$ as sub-nodes $350_1$-$350_J$ (hereinafter collectively referred to as sub-node 350) in the node $310_2$, wherein J is a natural number larger than 1.

In some embodiments, the scheduling module 140 may organize the sub-nodes in a single node 310 in the form of a tree. For example, the scheduling module 140 may determine the sub-nodes (e.g., the sub-nodes 320 and 340) corresponding to the network card as root sub-nodes. Since the sub-nodes are the representation of the dedicated processing resource 115 and the relevant hardware resource, the connection (also called an edge) between the sub-nodes may represent the connection between the dedicated processing resource and the relevant hardware resource.

The scheduling module 140 may determine, based on the second connection attribute, a distance (a distance of an edge) between two sub-nodes that are connected among the plurality of sub-nodes. The distance may indicate the performance of the connection between the two sub-nodes that are connected. That is to say, the distance may indicate the performance of the connection between the dedicated processing resource 115 and the relevant hardware resource that are connected. In some embodiments, the distance may be represented with a numerical value, wherein a larger numerical value may indicate that the performance of the connection is worse, and a smaller numerical value may indicate that the performance of the connection is better.

Optionally, the scheduling module 140 may determine the topology 300 based on the utilization rate of the dedicated processing resource 115. In some embodiments, the scheduling module 140 may weight, based on the utilization rate of the dedicated processing resource 115, the performance of the connection between the dedicated processing resource 115 and another dedicated processing resource 115. For example, in the case that the utilization rate of the dedicated processing resource $115_2$ is higher than a predetermined threshold, even though the performance of the connection between the dedicated processing resource $115_1$ and the dedicated processing resource $115_2$ is good, the connection therebetween with a good performance cannot be completely utilized due to the high utilization rate of the dedicated processing resource $115_2$. In this case, it is possible to perform penalty weighting for the performance of the connection therebetween (the distance between the sub-node $330_1$ and sub-node $350_1$), for example, multiply by 75%.

Although the above describes the case that the scheduling module 140 determines the dedicated processing resource 115 and the network card as the sub-nodes, it should be appreciated that in some embodiments, the scheduling module 140 may further determine the CPU as the sub-node, thereby considering the performance of the connection between the dedicated processing resource 115 and the CPU. Alternatively, the scheduling module 140 may also use the performance of the connection between the dedicated processing resource 115 and the CPU as additional information associated with the topology 300.

In some embodiments, the topology 300 determined in the above manner may be stored in a graph database or a key value database. For example, when the topology is stored in the key value database, a key may represent a connection from a node/sub-node to another node/sub-node, and the value may represent the performance of the connection.

Since the topology 300 contains node information and edge information indicating the connection between the dedicated processing resources 115 and the performance of the connection, the scheduling module 140 may determine, based on the topology 300, the performance of the connection between any two dedicated processing resources 115 in the dedicated processing resource cluster.

For example, given the dedicated processing resource $115_1$ in the dedicated processing resource server $110_1$ and the dedicated processing resource $115_2$ in the dedicated processing resource server $110_2$, the scheduling module 140 may determine the performance of the connection between the dedicated processing resource $115_1$ and the dedicated processing resource $115_2$ based on the following three items: the performance of the connection from the dedicated processing resource $115_1$ to the network card in the dedicated processing resource server $110_1$ (namely, the distance 360 from the sub-node $330_1$ to the sub-node 320), the performance of the connection from the network card to another network card in the dedicated processing resource server $110_2$ (namely, the distance 370 from the sub-node 320 to the sub-node 340), and the performance of the connection from the other network card to the dedicated processing resource $115_2$ (namely, the distance 380 from sub-node 340 to the sub-node $350_1$).

It should be appreciated that since the dedicated processing resource server 110 is connected to one another via the network 120, the performance of the connection from the network card in the dedicated processing resource server 110 to another network card in another dedicated processing resource server 110 is equivalent to the performance of the connection from the dedicated processing resource server 110 to the other dedicated processing resource server 110.

For example, in some embodiments, the scheduling module 140 may determine the performance of the connection between the dedicated processing resources based on the worst performance (e.g., a maximum distance value) of the above three items. Alternatively, the scheduling module 140 may combine the above three items (e.g., a sum of the distance values) to determine the performance of the connection between the dedicated processing resources.

As stated above, FIG. 3 shows an example in which the dedicated processing resource server 110 is determined as the node 310 in the topology 300. However, the topology of the dedicated processing resource is not limited thereto. As another example, FIG. 4 shows an example of determining the dedicated processing resource 115 as the node in a topology 400 in the case that the direct connection of the dedicated processing resource is enabled.

Figure 4:
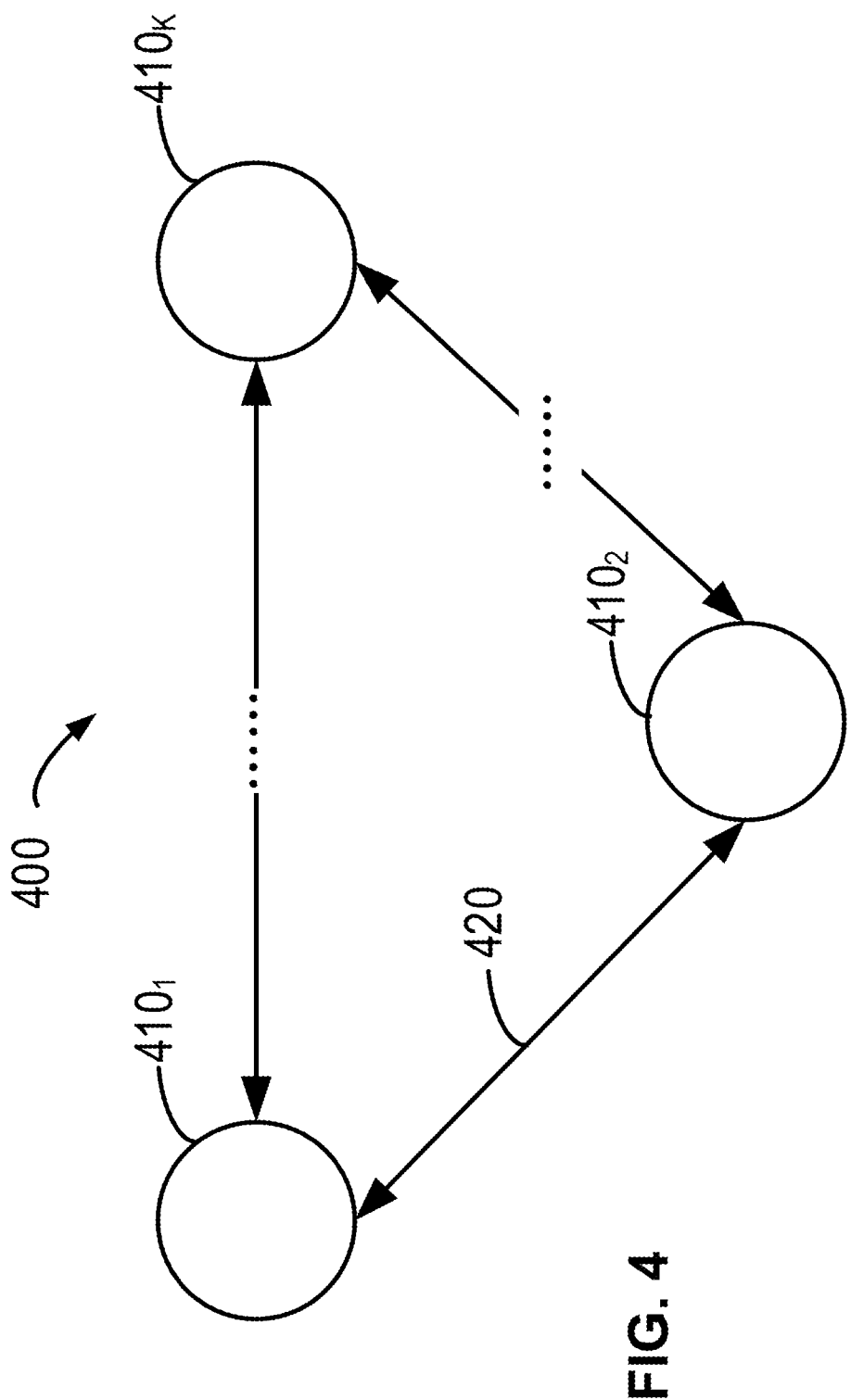
FIG. 4 illustrates a schematic diagram of another example of a topology of dedicated processing resources according to an embodiment of the present disclosure.

As shown in FIG. 4, the topology 400 comprises a group of nodes $410_1$-$410_K$ (hereinafter collectively referred to as node 410), wherein K is a natural number larger than 1. The scheduling module 140 may determine the dedicated processing resource 115 as the node 410 in the topology 400. For example, the scheduling module 140 may determine the dedicated processing resource $115_1$ as the node $410_1$, determine the dedicated processing resource $115_2$ as the node $410_2$, and determine the dedicated processing resource $115_N$ as node $410_K$.

It may be appreciated that since the node 410 is the representation of the dedicated processing resource 115 in the topology 400, the connection (also called an edge) between the nodes 410 may represent the connection between the dedicated processing resources 115. The scheduling module 140 may determine, based on the connection attribute of the direct connection between dedicated processing resources 115, a distance (a distance of an edge) between two nodes 410 that are connected among the plurality of nodes 410. The distance may indicate the performance of the connection between two nodes 410 that are connected. That is to say, the distance may indicate the performance of the connection between two dedicated processing resources 115 that are connected. In some embodiments, the distance may be represented with a numerical value, wherein a larger numerical value may indicate the performance of the connection is worse, and a smaller numerical value may indicate that the performance of the connection is better.

It is noted that although logically the performance (distance) of the direct connection between dedicated processing resources 115 may be determined using the connection attribute of the direct connection, physically the direct connection between dedicated processing resources 115 still depends on the connection between the dedicated processing resource 115 and the relevant hardware resource in the same dedicated processing resource sever 110 and the connection between the dedicated processing resource servers 110. In other words, the performance of the direct connection between the dedicated processing resources 115 still depends on the first connection attribute and second connection attribute.

Optionally, the scheduling module 140 may determine the topology 400 based on the utilization rate of the dedicated processing resource 115. In some embodiments, the scheduling module 140 may weight, based on the utilization rate of the dedicated processing resource 115, the performance of the connection between the dedicated processing resource 115 and another dedicated processing resource 115. For example, in the case that the utilization rate of the dedicated processing resource $115_2$ is higher than a predetermined threshold, even though the performance of the connection between the dedicated processing resource $115_1$ and the dedicated processing resource $115_2$ is good, the connection therebetween with a good performance cannot be completely utilized due to the high utilization rate of the dedicated processing resource $115_2$. In this case, it is possible to perform penalty weighting for the performance of the connection therebetween (the distance 420 between the node $410_1$ and the node $410_2$), for example, multiply by 75%.

In some embodiments, the topology 400 determined in the above manner may be stored in a graph database or a key value database. For example, when the topology is stored in the key value database, a key may represent a connection from a node to another node, and the value may represent the performance of the connection.

Since the topology 400 contains node information and edge information indicating the connection between the dedicated processing resources 115 and the performance of the connection, the scheduling module 140 may determine, based on the topology 400, the performance of the connection between any two dedicated processing resources 115 in the dedicated processing resource cluster.

In this manner, the dedicated processing resource scheduling system 100 may determine the topology in the range of the cluster, with the dedicated processing resource 115 as a center. The topology contains information about the connection of any two dedicated processing resources 115 in the dedicated processing resource cluster and the performance of the connection. Hence, it is feasible to, by virtue of the topology, configure and schedule the dedicated processing resource in the range of the cluster in an optimized manner, thereby improving the performance and the resource utilization rate of the dedicated processing resource scheduling system.

Topology-Based Dedicated Processing Resource Scheduling

Figure 5:
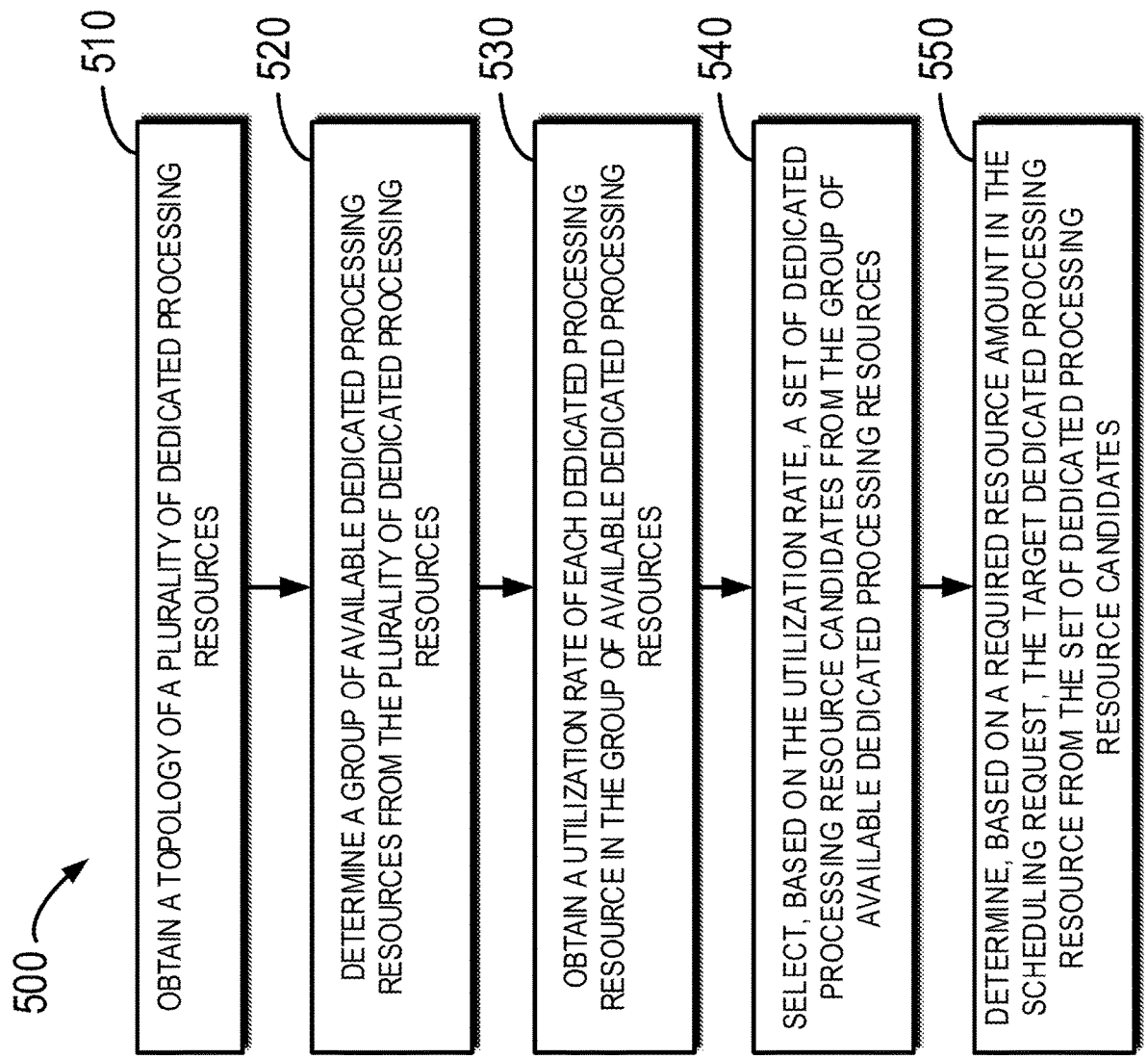
FIG. 5 illustrates a flow chart of a detailed example of a method of scheduling dedicated processing resources according to an embodiment of the present disclosure.

FIG. 5 illustrates a flow chart of a detailed example of a method 500 of scheduling dedicated processing resources according to an embodiment of the present disclosure. For example, the method 500 may be executed by the scheduling module 140 as shown in FIG. 1. It should be appreciated that the method 500 is an example implementation of the method 200, but the implementation of the method 200 is not limited thereto. In addition, the method 500 may further include additional steps not shown and/or the shown steps may be omitted. The scope of the present disclosure is not limited in this regard.

At 510, upon receiving a request sent by the client 130 to schedule the dedicated processing resource 115 via the network 120, the scheduling module 140 may obtain the topology of the dedicated processing resource 115 determined in the above manner. For example, the scheduling request may indicate the capacity of the dedicated processing resource requested to be scheduled by the client 130, for example, the number of the dedicated processing resources.

At 520, the scheduling module 140 may determine a group of available dedicated processing resources in the dedicated processing resource cluster. For example, the scheduling module 140 may determine an offline dedicated processing resource 115 as unavailable. In addition, the scheduling module 140 may determine, based on the utilization rate of the dedicated processing resource 115, whether the dedicated processing resource 115 is available. The scheduling module 140 may determine the dedicated processing resource 115 whose utilization rate is higher than a predetermined threshold as unavailable. In addition, in the case that a system administrator specifies some dedicated processing resources 115 unavailable, the scheduling module 140 may determine the specified dedicated processing resources 115 as unavailable.

At 530, the scheduling module 140 may obtain the utilization rate of each dedicated processing resource in the group of available dedicated processing resources. Alternatively, the scheduling module 140 may obtain the utilization rate of the specified dedicated processing resources in the dedicated processing resource cluster. For example, the scheduling module 140 may obtain the utilization rate of the dedicated processing resources specified by the system administrator.

At 540, the scheduling module 140 may select, based on the obtained utilization rate, a set of dedicated processing resource candidates from the group of available dedicated processing resources. In some embodiments, the scheduling module 140 may select, from the group of available dedicated processing resources, the available dedicated processing resources whose utilization rate is below a predetermined threshold as the set of dedicated processing resource candidates.

At 550, the scheduling module 140 determines a target dedicated processing resource from the set of dedicated processing resource candidates based on the resource amount required in the scheduling request. In some embodiments, the scheduling module 140 may select, based on the obtained topology 300 and/or 400, dedicated processing resources whose performance of connection with the set of dedicated processing resource candidates is higher than a predetermined threshold, until the resource amount of the set of dedicated processing resource candidates and the selected dedicated processing resources satisfy the required resource amount. For example, the scheduling module 140 may determine, based on the shortest path algorithm, the dedicated processing resources with the best performance (the shortest distance) of the connection with the set of dedicated processing resource candidates. The shortest path algorithm includes but is not limited to Dijkstra algorithm, Bellman-Ford algorithm, Floyd algorithm, and the like. The scheduling module 140 may determine the set of dedicated processing resource candidates and the selected dedicated processing resources satisfying the required resource amount as the target dedicated processing resources.

As a specific example of scheduling the dedicated processing resource 115 based on the topology 300 and/or 400, in the case that the scheduling request sent at the client 130 is a request for five dedicated processing resources, the scheduling module 140 selects an available dedicated processing resource with the lowest utilization rate as the set of dedicated processing resource candidates. The scheduling module 140 may select, based on the obtained topology 300 and/or 400, the other four dedicated processing resources with the best performance of connection with the dedicated processing resource with the lowest utilization rate.

In some cases, the scheduling module 140 might only select the other two dedicated processing resources with the best performance of connection with the dedicated processing resource with the lowest utilization rate. In this case, the scheduling module 140 may additionally select a further dedicated processing resource with the lowest utilization rate and add it to the set of dedicated processing resource candidates. The scheduling module 140 may select, based on the topology 300 and/or 400, another dedicated processing resource having the best performance of connection with the further dedicated processing resource, so that the set of dedicated processing resource candidates and the selected dedicated processing resources can satisfy the required resource amount.

In some embodiments, the scheduling module 140 may determine a plurality of groups of dedicated processing resources satisfying the required resource amount, for example, the first group of dedicated processing resources satisfying the required resource amount, and the second group of dedicated processing resources that is different from the first group of dedicated processing resources and satisfies the required resource amount. The scheduling module 140 may determine, based on various factors, the target dedicated processing resources from the first group of dedicated processing resources and the second group of dedicated processing resources.

In some embodiments, the scheduling module 140 may determine, based on global load balance, the target dedicated processing resources from the first group of dedicated processing resources and the second group of dedicated processing resources. For example, the scheduling module 140 may be more inclined to select a group of dedicated processing resources with a low utilization rate as the target dedicated processing resources to facilitate global load balance.

Alternatively, the scheduling module 140 may determine, based on a connection cost, the target dedicated processing resources from the first group of dedicated processing resources and the second group of dedicated processing resources. For example, in the case that the connection cost of the first group of dedicated processing resources is higher than that of the second group of dedicated processing resources, the scheduling module 140 may preferably select the second group of dedicated processing resources as the target dedicated processing resources.

Alternatively, the scheduling module 140 may further determine, based on cross-rack traffic, the target dedicated processing resources from the first group of dedicated processing resources and second group of dedicated processing resources. For example, in the case that the cross-rack traffic generated by the first group of dedicated processing resources is higher than that of the second group of dedicated processing resources, the scheduling module 140 may preferably select the second group of dedicated processing resources as the target dedicated processing resources.

In some embodiments, the scheduling module 140 may determine the performance of the group of dedicated processing resources based on the performance of the connection between dedicated processing resources in a group of dedicated processing resources. In this case, the scheduling module may weight a plurality of groups of dedicated processing resources based on the global load balance, the connection cost and/or the cross-rack traffic, to finally determine the target dedicated processing resources.

For example, in the case that the dedicated processing resources in the first group of dedicated processing resources having a high utilization rate and being selected as the target dedicated processing resources do not facilitate the global load balance, the scheduling module 140 may perform penalty weighting for the performance of the first group of dedicated processing resources, for example, multiply by 90%. In the case that the dedicated processing resources in the second group of dedicated processing resources have low connection costs, the scheduling module 140 may perform incentive weighting for the performance of the first group of dedicated processing resources, for example, multiply by 110%.

In this manner, by considering various factors such as the global load balance, the connection cost and/or the cross-rack traffic, the scheduling module 140 may adjust the performance of the plurality of groups of dedicated processing resources, thereby determining the most appropriate target dedicated processing resources satisfying the required resource amount.

After the scheduling module 140 determines the target dedicated processing resources, the scheduling module 140 may send a scheduling response indicating the target dedicated processing resources to the server control module 170 via the network 120, to instruct the server control module 170 to provide the client 130 with the required dedicated processing resource amount. Alternatively, the scheduling module 140 may send a scheduling response indicating the target dedicated processing resources to the client 130 via the network 120, so that the client 130 may request the dedicated processing resource server 110 for the target dedicated processing resources according to the scheduling response.

The scheduling response may indicate the dedicated processing resource server 110 related to the target dedicated processing resources and the dedicated processing resources 115 therein. For example, the scheduling response may employ the following list format: [dedicated processing resource server 1. dedicated processing resource 1, dedicated processing resource server 2. dedicated processing resource 2 . . . ]. It should be appreciated that the scheduling response may also employ any other suitable format. The above example is only exemplary and not restrictive.

In this manner, the dedicated processing resource scheduling system 100 may use the topology 300 and/or 400 determined to configure and schedule the dedicated processing resources in an optimized manner, thereby improving the dedicated processing resource scheduling system 100 in a smart and efficient manner.

Figure 6:
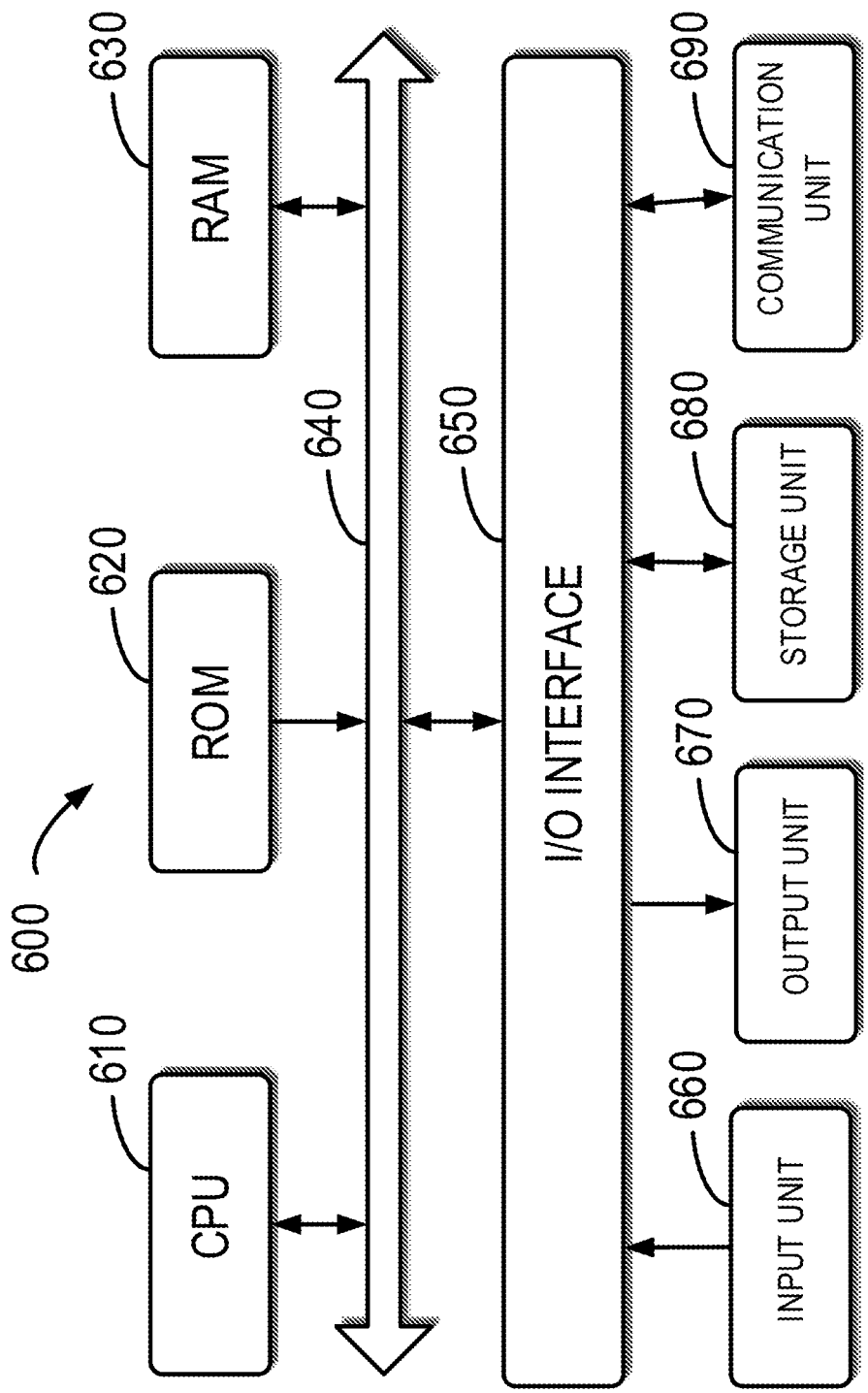
FIG. 6 illustrates a schematic block diagram of an example apparatus that can be used to implement embodiments of the present disclosure.

FIG. 6 is a schematic block diagram of an example apparatus 600 that can be used to implement embodiments of the present disclosure. For example, the scheduling module 140 shown in FIG. 1 may be implemented by the apparatus 600. As shown in FIG. 6, the apparatus 600 comprises a CPU 610 which is capable of performing various processes in accordance with computer program instructions stored in a read only memory (ROM) 620 or computer program instructions loaded from a storage unit 680 to a random access memory (RAM) 630. Various programs and data as required by operation of the apparatus 600 are stored in the RAM 630. The CPU 610, the ROM 620 and the RAM 630 are connected to one another via a bus 640. An input/output (I/O) interface 650 is also connected to the bus 640.

The following components in the apparatus 600 are connected to the I/O interface 650: an input unit 660 including a keyboard, a mouse, or the like; an output unit 670 such as various types of displays and speakers; the storage unit 680 such as a magnetic disk or optical disk; and a communication unit 690 such as a network card, a modem, a wireless communication transceiver or the like. The communication unit 690 allows the apparatus 600 to exchange information/data with other devices via a computer network such as the Internet and/or various telecommunication networks.

The CPU 610 performs various methods and processes described above, for example methods 200 and 500. For example, in some embodiments, the methods 200 and 500 may be implemented as a computer software program, which is tangibly contained in a machine-readable medium, for example the storage unit 680. In some embodiments, part or all of the computer program may be loaded and/or installed on the apparatus 600 via ROM 620 and/or communication unit 690. When the computer program is loaded in the RAM 630 and executed by CPU 610, one or more acts of the methods 200 and 500 described above may be executed.

The present disclosure may be a method, apparatus, system and/or computer program product. The computer program product may include a computer readable medium on which computer readable program instructions for executing various aspects of the present disclosure are embodied.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flow chart illustrations and/or block diagrams of methods, apparatus (systems), and computer program products according to embodiments of the disclosure. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the Figures illustrate the architecture, functionality, and operation of possible implementations of systems, methods and computer program products according to various embodiments of the present disclosure. In this regard, each block in the flow chart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration, and combinations of blocks in the block diagrams and/or flow chart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, and to otherwise enable those of ordinary skill in the art to understand the embodiments disclosed herein.

What is claimed is:

1. A method of scheduling dedicated processing resources, comprising:
    in response to receiving a scheduling request for a plurality of dedicated processing resources, obtaining a topology of the plurality of dedicated processing resources, the topology being determined based on connection attributes related to connections among the plurality of dedicated processing resources;
    determining, based on the topology, a target dedicated processing resource satisfying the scheduling request from the plurality of dedicated processing resources; and
    scheduling the target dedicated processing resource satisfying the scheduling request;
    wherein the plurality of dedicated processing resources are distributed across a plurality of dedicated processing resource servers, and obtaining the topology comprises:
    obtaining a first connection attribute relating to multiple ones of the dedicated processing resource servers, the first connection attribute indicating at least one of delays, bandwidths, throughputs, transmission rates, transmission qualities and network utilization rates of connections among the plurality of dedicated processing resource servers;
    obtaining a second connection attribute relating to a particular one of the dedicated processing resource servers, the second connection attributes indicating types of connections among dedicated processing resources and relevant hardware resources in the particular dedicated processing resource server; and
    determining the topology based at least in part on the first and second connection attributes.

2. The method according to claim 1, wherein determining the topology comprises:
    determining the plurality of dedicated processing resource servers as a plurality of nodes in the topology; and
    determining, based on the first connection attribute, a distance between two nodes of the plurality of nodes that are connected, the distance indicating a performance of a connection between the two nodes.

3. The method according to claim 2, wherein determining the topology further comprises:
    determining the dedicated processing resources and the relevant hardware resources in the particular dedicated processing resource server as a plurality of sub-nodes of a respective node in the plurality of nodes; and
    determining, based on the second connection attribute, a distance between two sub-nodes of the plurality of sub-nodes that are connected, the distance indicating a performance of a connection between the two sub-nodes.

4. The method according to claim 1, wherein determining the topology comprises:
    determining the plurality of dedicated processing resources as a plurality of nodes in the topology; and
    determining, based on the first and second connection attributes, a distance between two nodes of the plurality of nodes that are connected, the distance indicating a performance of a connection between the two nodes.

5. The method according to claim 1, wherein obtaining the topology comprises:

obtaining a utilization rate of each of the plurality of dedicated processing resources; and determining the topology based on the utilization rates and the connection attributes.

6. The method according to claim 1, wherein determining the target dedicated processing resource comprises:

determining a group of available dedicated processing resources from the plurality of dedicated processing resources;

obtaining a utilization rate of each dedicated processing resource in the group of available dedicated processing resources;

selecting, based on the utilization rate, a set of dedicated processing resource candidates from the group of available dedicated processing resources; and determining, based on a required resource amount in the scheduling request, the target dedicated processing resource from the set of dedicated processing resource candidates.

7. The method according to claim 6, wherein selecting the set of dedicated processing resource candidates comprises:

selecting, from the group of available dedicated processing resources, available dedicated processing resources having utilization rates below a predetermined threshold, as the set of dedicated processing resource candidates.

8. The method according to claim 6, wherein determining, based on the required resource amount, the target dedicated processing resource comprises:

selecting, based on the topology, dedicated processing resources of which the connections with the set of dedicated processing resource candidates have performances above a predetermined threshold, until the resource amount of the set of dedicated processing resource candidates and the selected dedicated processing resources satisfies the required resource amount.

9. The method according to claim 1, wherein determining the target dedicated processing resource comprises:

determining a first group of dedicated processing resources and a second group of dedicated processing resources being different from the first group of dedicated processing resources; and determining the target dedicated processing resource from the first and second groups of dedicated processing resources based on at least one of global load balance, a connection cost, and cross-rack traffic.

10. An apparatus for scheduling dedicated processing resources, comprising:

at least one processing unit;

at least one memory coupled to the at least one processing unit and storing instructions to be executed by the at least one processing unit, the instructions, when executed by the at least one processing unit, causing the apparatus to perform acts comprising:

in response to receiving a scheduling request for a plurality of dedicated processing resources, obtaining a topology of the plurality of dedicated processing resources, the topology being determined based on connection attributes related to connections among the plurality of dedicated processing resources;

determining, based on the topology, a target dedicated processing resource satisfying the scheduling request from the plurality of dedicated processing resources; and scheduling the target dedicated processing resource satisfying the scheduling request;

wherein the plurality of dedicated processing resources are distributed across a plurality of dedicated processing resource servers, and obtaining the topology comprises:

obtaining a first connection attribute relating to multiple ones of the dedicated processing resource servers, the first connection attribute indicating at least one of delays, bandwidths, throughputs, transmission rates, transmission qualities and network utilization rates of connections among the plurality of dedicated processing resource servers;

obtaining a second connection attribute relating to a particular one of dedicated processing resource servers, the second connection attribute indicating types of connections among dedicated processing resources and relevant hardware resources in the particular dedicated processing resource server; and determining the topology based at least in part on the first and second connection attributes.

11. The apparatus according to claim 10, wherein determining the topology comprises:

determining the plurality of dedicated processing resource servers as a plurality of nodes in the topology; and determining, based on the first connection attribute, a distance between two nodes of the plurality of nodes that are connected, the distance indicating a performance of a connection between the two nodes.

12. The apparatus according to claim 11, wherein determining the topology further comprises:

determining the dedicated processing resources and the relevant hardware resources in the particular dedicated processing resource server as a plurality of sub-nodes of a respective node in the plurality of nodes; and determining, based on the second connection attribute, a distance between two sub-nodes of the plurality of sub-nodes that are connected, the distance indicating a performance of a connection between the two sub-nodes.

13. The apparatus according to claim 10, wherein determining the topology comprises:

determining the plurality of dedicated processing resources as a plurality of nodes in the topology; and determining, based on the first and second connection attributes, a distance between two nodes of the plurality of nodes that are connected, the distance indicating a performance of a connection between the two nodes.

14. The apparatus according to claim 10, wherein obtaining the topology comprises:

obtaining a utilization rate of each of the plurality of dedicated processing resources; and determining the topology based on the utilization rate and the connection attributes.

15. The apparatus according to claim 10, wherein determining the target dedicated processing resource comprises:

determining a group of available dedicated processing resources from the plurality of dedicated processing resources;

obtaining a utilization rate of each dedicated processing resource in the group of available dedicated processing resources;

selecting, based on the utilization rate, a set of dedicated processing resource candidates from the group of available dedicated processing resources; and determining, based on a required resource amount in the scheduling request, the target dedicated processing resource from the set of dedicated processing resource candidates.

16. The apparatus according to claim 15, wherein selecting the set of dedicated processing resource candidates comprises:
  selecting, from the group of available dedicated processing resources, available dedicated processing resources having utilization rates below a predetermined threshold, as the set of dedicated processing resource candidates.

17. The apparatus according to claim 15, wherein determining, based on the required resource amount; the target dedicated processing resource comprises:
  selecting, based on the topology, dedicated processing resources of which the connections with the set of dedicated processing resource candidates have performance above a predetermined threshold, until the resource amount of the set of dedicated processing resource candidates and the selected dedicated processing resources satisfies the required resource amount.

18. A computer program product comprising a non-transitory computer readable storage medium having stored therein machine executable instructions of one or more software programs, wherein the machine executable instructions, when executed by a machine, cause the machine to:
  in response to receiving a scheduling request for a plurality of dedicated processing resources, obtain a topology of the plurality of dedicated processing resources, the topology being determined based on connection attributes related to connections among the plurality of dedicated processing resources;
  determine, based on the topology, a target dedicated processing resource satisfying the scheduling request from the plurality of dedicated processing resources; and
  schedule the target dedicated processing resource satisfying the scheduling request;
  wherein the plurality of dedicated processing resources are distributed across a plurality of dedicated processing resource servers, and obtaining the topology comprises:
    obtaining a first connection attribute relating to multiple ones of the dedicated processing resource servers, the first connection attribute indicating at least one of delays, bandwidths, throughputs, transmission rates, transmission qualities and network utilization rates of connections among the plurality of dedicated processing resource servers;
    obtaining a second connection attribute relating to a particular one of dedicated processing resource servers, the second connection attribute indicating types of connections among dedicated processing resources and relevant hardware resources in the particular dedicated processing resource server; and
    determining the topology based at least in part on the first and second connection attributes.

19. The computer program product according to claim 18, wherein determining the topology comprises:
  determining the plurality of dedicated processing resource servers as a plurality of nodes in the topology; and
  determining, based on the first connection attribute, a distance between two nodes of the plurality of nodes that are connected, the distance indicating a performance of a connection between the two nodes.

20. The computer program product according to claim 19, wherein determining the topology further comprises:
  determining the dedicated processing resources and the relevant hardware resources in the particular dedicated processing resource server as a plurality of sub-nodes of a respective node in the plurality of nodes; and
  determining, based on the second connection attribute, a distance between two sub-nodes of the plurality of sub-nodes that are connected, the distance indicating a performance of a connection between the two sub-nodes.

* * * * *

UNITED STATES PATENT AND TRADEMARK OFFICE
CERTIFICATE OF CORRECTION

PATENT NO. : 10,983,828 B2  
APPLICATION NO. : 16/245500  
DATED : April 20, 2021  
INVENTOR(S) : Junping Zhao et al.

Page 1 of 1

It is certified that error appears in the above-identified patent and that said Letters Patent is hereby corrected as shown below:

In the Claims

Claim 1, Column 16, Line 33 please delete "the second connection attributes" and insert therefor --the second connection attribute--

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*